US010292190B2

United States Patent
Xu et al.

(10) Patent No.: US 10,292,190 B2
(45) Date of Patent: May 14, 2019

(54) METHOD OF SELECTING AND INTERCONNECTING DISTRIBUTED PACKET CORE NODES

(71) Applicant: Syniverse Technologies, LLC, Tampa, FL (US)

(72) Inventors: Huiyue Xu, Beijing (CN); David Zhang, San Jose, CA (US); Edward Yau, Tseung Kwan O (HK); Prashant Datar, Tampa, FL (US); Sreenivasa Ganji, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/156,219

(22) Filed: Oct. 10, 2018

(65) Prior Publication Data

US 2019/0110324 A1    Apr. 11, 2019

Related U.S. Application Data

(60) Provisional application No. 62/570,657, filed on Oct. 10, 2017.

(51) Int. Cl.
| | |
|---|---|
| *H04W 76/12* | (2018.01) |
| *H04W 88/16* | (2009.01) |
| *H04W 76/22* | (2018.01) |
| *H04W 8/26* | (2009.01) |
| *H04L 12/46* | (2006.01) |
| *H04L 29/12* | (2006.01) |

(52) U.S. Cl.
CPC ......... *H04W 76/12* (2018.02); *H04L 12/4633* (2013.01); *H04W 8/26* (2013.01); *H04W 76/22* (2018.02); *H04W 88/16* (2013.01); *H04L 61/6054* (2013.01)

(58) Field of Classification Search
CPC ....... H04W 76/12; H04W 8/26; H04W 88/16; H04W 76/22; H04L 12/4633; H04L 61/6054
See application file for complete search history.

(56) References Cited

U.S. PATENT DOCUMENTS

2014/0269533 A1* 9/2014 Hua .................... H04L 49/90
370/329
2017/0373953 A1* 12/2017 George ................ H04L 63/306

* cited by examiner

*Primary Examiner* — Hashim S Bhatti
(74) *Attorney, Agent, or Firm* — Andriy Lytvyn; Smith & Hopen, P.A.

(57) ABSTRACT

A networking and application system for handling the data communications protocols in the mobile packet core network. General Packet Radio Service (GPRS) Tunneling Protocol (GTP) has a control plane for control signaling (GTP-C) and a data plane for user data (GTP-U). A GTP Switch interfaces with Serving GPRS Support Node (SGSN) and/or serving gateway (S-GW). The GTP Switch provides Internment Protocol (IP) address manipulation to hide the topology of distributed control plane and data plane instances. The GTP Switch also implements dynamic node selection to route the control signaling and data plane traffic to different instances, hosted on separate servers, thus enabling higher flexibility in the network routing path optimization and scalable and elastic handling of the data traffic.

17 Claims, 4 Drawing Sheets

METHOD OF SELECTING AND INTERCONNECTING DISTRIBUTED PACKET CORE NODES

PRIORITY CLAIM

This non-provisional patent application claims priority to the U.S. Provisional Application No. 62/570,657 entitled "Selection and Interconnect for Distributed Packet Core Nodes," which was filed on Oct. 10, 2017.

BACKGROUND OF THE INVENTION

1. Field of the Invention

This invention relates generally to the field of telecommunications networks. More specifically, the invention pertains to selection and interconnection of distributed packet core nodes the mobile packet core network in the General Packet Radio Service (GPRS) or 3G network, or the Evolved Packet Core (EPC) of the Long Term Evolution (LTE) network.

2. Brief Description of the Related Art

In modern mobile data networks, the Gateway General packet radio service Serving Node (GGSN) and/or Packet data network Gateways (P-GW) handle the control signaling and data plane traffic exchange with the Serving GPRS Support Node (SGSN) and/or serving gateway (SGW). This protocol is defined in the GPRS Tunneling Protocol (GTP). More specifically, the control signaling protocol is called GPRS Tunneling Protocol Control signaling (GTP-C), and the user plane protocol is called GPRS Tunneling Protocol User data (GTP-U). GGSN/P-GW bundles the GTP-C module and GTP-U modules together into one node running on the same server. Such implementation, however, has certain limitations for the scalability and operation.

With a ubiquitous and ever-increasing use cases of Internet of Thing (IoT) deployment, the potential number of GTP-U instances increase drastically and require more dynamic change with elastic scalability. Moreover, the GTP-U instances need to be deployed into different networks: e.g. mobile carrier's owned cloud network, $3^{rd}$ party cloud networks, or customer's own network. Thus, there is a need for an intelligent gateway as the intermedium gateway to bridge between the GGSN and SGSN, or between the PGW and SGW. However, in light of the current art as a whole, such an intelligent gateway is not known.

SUMMARY OF THE INVENTION

This invention pertains to methods and systems configured to resolve the problem described above. These methods and systems are configured to separate the control plane and data plane modules of the Gateway General packet radio service Serving Node (GGSN) and/or Packet data network gateways (P-GW) into independent and distributed nodes. A GTP Switch interfaces with Serving GPRS Support Node (SGSN) and/or serving gateway (S-GW) and performs flexible node selection to route the control plane and data plane traffic to different nodes. The GTP switch manipulates Interment Protocol (IP) addresses to hide the actual topology of distributed control plane and data plane node. The GTP Switch also selectively performs data layer manipulation, such as encryption and decryption to enhance the data transportation security.

In an embodiment, the invention pertains to a method of providing a distributed deployment of a control plane and a data plane of General Packet Radio Service (GPRS) Tunneling Protocol (GTP). A GTP Switch interfaces with a SGSN or S-GW. The GTP Switch also interfaces with a plurality of control plane nodes and a plurality of data plane nodes.

When the GTP Switch receives a GTP Control signaling (GTP-C) message from the SGSN or the S-GW, the GTP Switch identifies a first control plane node from the plurality of control plane nodes for control plane traffic. The first control plane node is hosted on a first server. Responsive to receiving a GTP data (GTP-U) message from the SGSN or the S-GW, a first data plane node suitable for data traffic is identified from the plurality of data plane nodes. The identified first data plane node is hosted on a second server, different from the first server. Thus, the first control plane node and the first data plane node are separate network nodes.

The GTP Switch routes subsequent uplink GTP-C messages from the SGSN or the S-GW to the first control plane node. The GTP Switch performs Network Address Translation (NAT) to translate a destination IP address of the GTP Switch to an IP address of the first control plane node. The GTP Switch routes subsequent downlink GTP-C messages from the first control plane node to the SGSN or the S-GW. The GTP Switch performs NAT to translate a source IP address of the GTP Switch to an IP address of the SGSN or the S-GW. The GTP Switch routes subsequent uplink GTP-U messages from the SGSN or the S-GW to the first data plane node, wherein the GTP Switch performs NAT to translate the destination IP address of the GTP Switch to an IP address of the first data plane node. The GTP Switch routes subsequent downlink GTP-U messages from the first data plane node to the SGSN or the S-GW, wherein the GTP Switch performs NAT to translate the source IP address of the GTP Switch to the IP address of the SGSN or the S-GW.

In an embodiment, the GTP Switch performs data encryption and decryption of the subsequent GTP-C or the subsequent GTP-U messages. Data encryption can be achieved using an encryption algorithm selected from the group consisting of Transport Layer Security (TLS), Secure Sockets Layer (SSL), Advanced Encryption Standard (AES), or any other encryption method known in the art. An encryption key or a decryption key is applied on a per GTP-U tunnel basis.

In an embodiment the first control plane node is selected based on visited network being identified as a home network or a roaming network. The first control plane node can be selected based on an International Mobile Subscriber Identity (IMSI) attribution selected from the group consisting of an IMSI range, an IMSI owner, and an IMSI profile.

The first data plane node can be selected based on a server network interconnection status with a remote content system. The first data plane node can be identified based on a current data plane node system being statistic, load-share, or active-standby for multiple nodes. The first data plane node can be identified by the GTP Switch or by the first control plane node.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
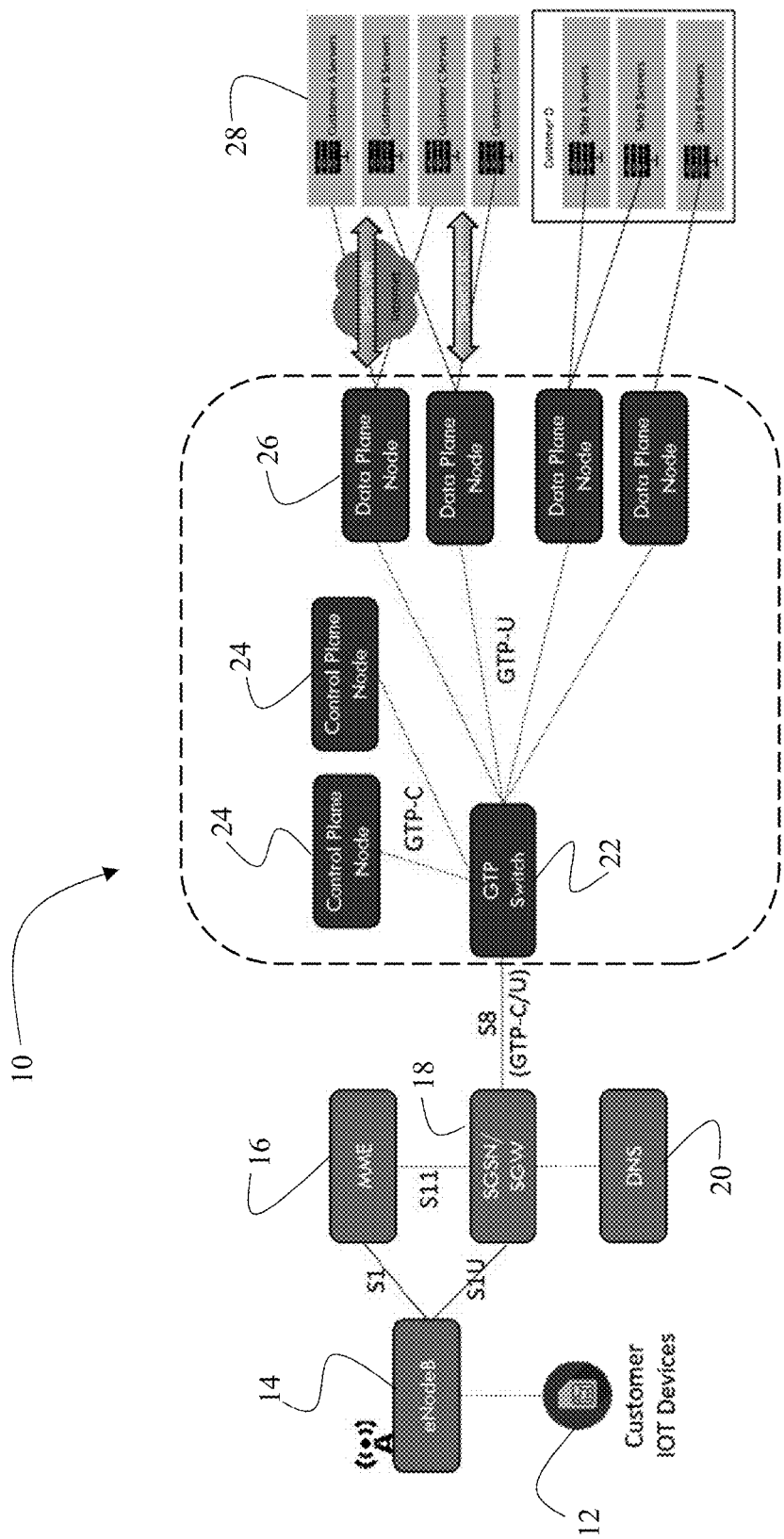
FIG. 1 is a diagram schematically depicting the network architecture of an embodiment of the present invention.

Referring to FIG. 1, a specialized networking and application system 10 introspects data communications between the user devices 12 and the core network system. In an embodiment, system 10 introspects and controls the GTP-C and GTP-U data packets in GPRS/3G/LTE networks.

FIG. 1 depicts an Internet of Things (IoT) device 12 connected to an eNodeB 14. eNodeB 14 is connected to a Mobility Management Entity (MME) 16 via S1 interface. Serving GPRS Support Node (SGSN) 18 or serving gateway (S-GW) 18 is in communication with eNodeB 14 vis S1-U interface and is also in communication with MME 16 via S11 interface. SGSN/S-GW 18 is also connected to a Domain Name Server (DNS) 20.

Specialized networking and application system 10 involves a GTP Switch 22. GTP Switch 22 and SGSN/S-GW 18 communicate with one another via S8 interface. Instead of using traditional GGSN/P-GW node, which bundles GTP-C and GTP-U messages, system 10 has separate control plane nodes 24 and data plane nodes 26. In an embodiment, control plane node 24 is hosted on different servers than data plane node 26. Upon receiving the GTP-C message from SGSN/S-GW 18, GTP Switch 22 executes a predefined node selection logic to identify a suitable control plane node 24 that can handle the specific GTP-C attach request and, then, routes the GTP-C attach request to the identified control plane node 24.

In an embodiment, upon receiving the GTP-C message, identified control plane node 24 executes another control plane node selection logic to reevaluate the identified suitable control plane node 24. This control plane node selection logic is based on selection criteria that include a combination of several factors, including but not limited to:
1) Visited network/operator identity: Home or Roaming
2) Access Point Name (APN)
3) International Mobile Subscriber Identification (IMSI) attribution (range, company, and etc.)
4) The system load of the identified control plane node 24
5) User Location Information In system 10, data plane node selection is separate from selection of control plane node 24 described above. Either control plane node 24 or the GTP Switch 22 can execute the data plane node selection logic to identify a suitable data plane node 26 to handle the data packets for the specific data session. The data plane node selection logic takes into account multiple factors pertaining to the network interconnect status with the remote content systems, including but not limited to:
1) Customer group definition: e.g., IoT Device Group A route to Site A, while route Group B traffic to Site B and C. In the case Site A is only served by Node A, then the Node A should be selected, although there could be multiple nodes that can serve the customer.
2) Load-share or active-standby for multiple sites.

Data plane nodes 26 are connected to customer servers 28. In an embodiment, the connection between any given data plane nodes 26 to customer server 28 is either be direct or via IP security suite protocol (IPSec) virtual network (VPN).

The control plane and data plane node selection logic can further take into account previously selected control plane node 24 and data plane node 26. This can be accomplished by using history for the specific device 12, identifiable via the IMSI in the SIM card. An advantage of selecting the previously used control plane node 24 and/or data plane node 26 is keeping the traffic stabilized and reducing the inter-node status synchronization because the same control and data plane nodes 24 and 26 will continue serving the same device 12. However, an advanced node selection algorithm can further detect the retry frequency of device 12, and, if there are many retries within a predefined time period, this could indicate problems with pervious control plane and/or data plane nodes 24 and 26. In such circumstance, the node selection algorithm selects a different control node 24 and/or different data node 26 than those previously used.

Figure 2:
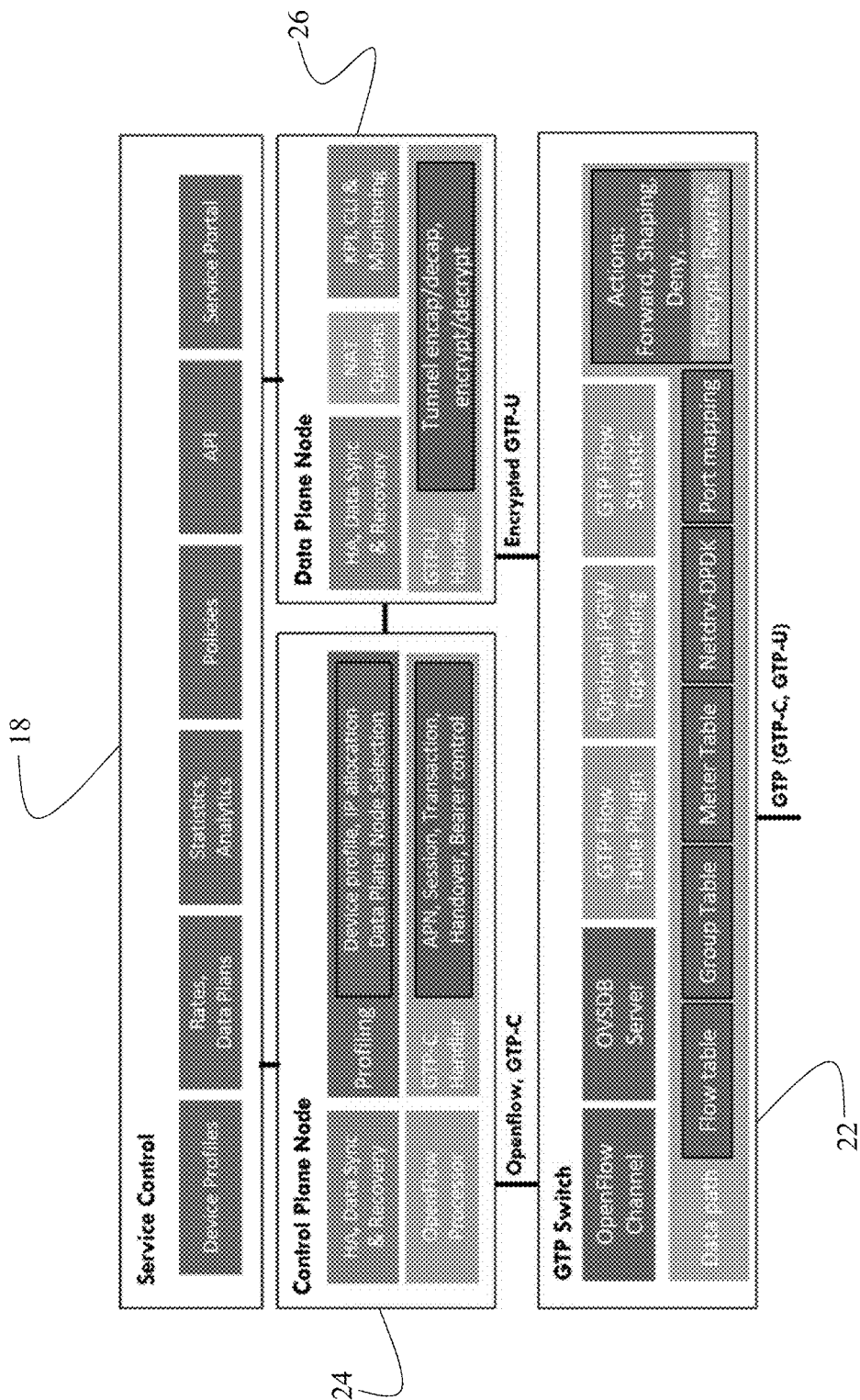
FIG. 2 is a diagram schematically depicting a software architecture of the present invention.

In an embodiment depicted in FIG. 2, system 10 utilizes a software-defined networking (SDN) solution to implement GTP Switch 22 function. In this embodiment, system 10 uses the open source framework OpenVSwitch as the basis. In other embodiments, system 10 can further utilize other technology, such as Layer 2 (L2) Switch or Probe system that taps into the link and mirrors the traffic to GTP Switch 22. GTP-Switch 22 then performs the similar function and modifies the GTP-C and GTP-U payload, which is transparent to the SGSN/S-GW 18.

Figure 3:
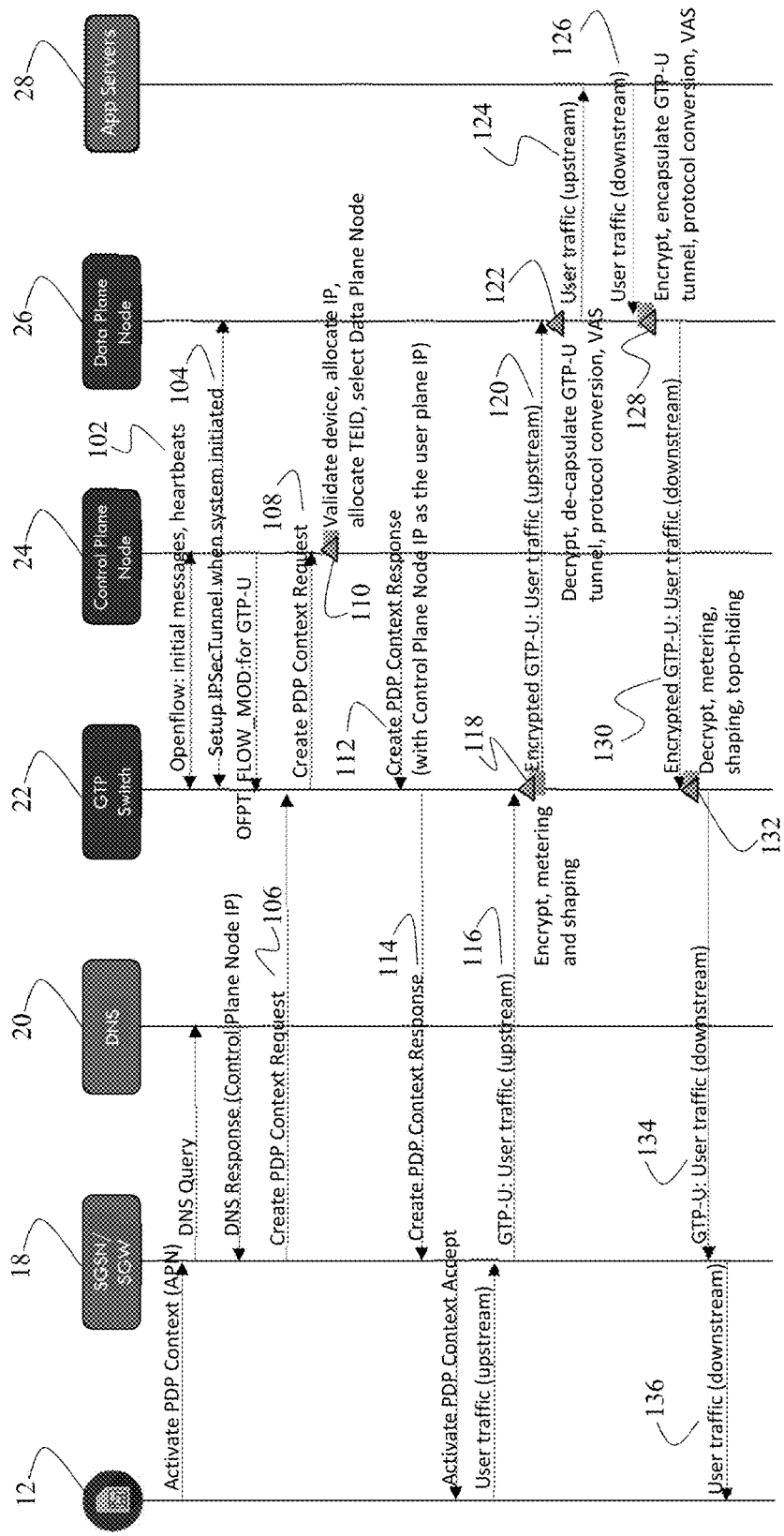
FIG. 3 is a signaling diagram depicting a message flow according to an embodiment of the present invention.

Signaling diagram depicted in FIG. 3 shows GTP Switch 22 interfacing with SGSN/S-GW 18 on one side and control plane node 24 and data plane node 26 on the other side. Subsequent to identifying a suitable control plane node 24 and a suitable data plane node 26, as disclosed above, GTP Switch 22 establishes a bidirectional communication with selected control plane node 24 for control signaling traffic in step 102. In an embodiment, the bidirectional communication is established via Openflow and involves initial messages and subsequent heartbeat signaling. In step 104, GTP Switch 22 sets up an IPSec Tunnel with selected data plane node 26 for data traffic.

In step 106, GTP Switch 22 receives a Create PDP Context Request from SGSN/S-GW 18. In step 108, GTP Switch 22 sends the Create PDP Context Request to control plane node 24. In step 110, control plane node 24 validates device 12, allocates an IP address, and TEID. In some embodiments, control plane node 24 also selects data plane node 26, if not selected by GTP Switch 22 or if a more suitable data plane node 26 can be identified. In step 112, control plane node 24 sends Create PDP Response back to GTP Switch 22, which GTP Switch 22 sends to SGSN/S-GW 18 in step 114.

In step 116, GTP Switch 22 receives GTP-U upstream traffic from SGSN/S-GW 18. In step 118, GTP Switch 22 encrypts, meters, and shapes the GTP-U data packets. Subsequently, in step 120, GTP Switch 22 sends the encrypted GTP-U traffic to data plane node 26. Data plane node 26 decrypts and decapsulates GTP-U tunnel and performs protocol conversion and value added services (VAS) in step 122. In step 124, data plane node 26 sends GTP-U data packets to Application Servers 28. In an embodiment, encryption algorithm is selected from Transport Layer Security (TLS), Secure Sockets Layer (SSL), or Advanced Encryption Standard (AES).

In step 126, data plane node 26 receives downstream GTP-U traffic from Application Servers 28. In step 128, data plane node 26 encrypts and encapsulates GTP-U tunnel and performs protocol conversion and VAS, as needed. GTP Switch 22 receives the encrypted GTP-U downstream traffic from data plane node 26 in step 130. In step 132, GTP Switch 22 decrypts, meters, shapes, and hides the topology of GTP-U data packets. In step 134, GTP Switch sends decrypted GTP-U downstream traffic to SGSN/S-GW 18. In step 136, device 12 receives downstream GTP-U data packets from SGSN/S-GW 18.

Figure 4:
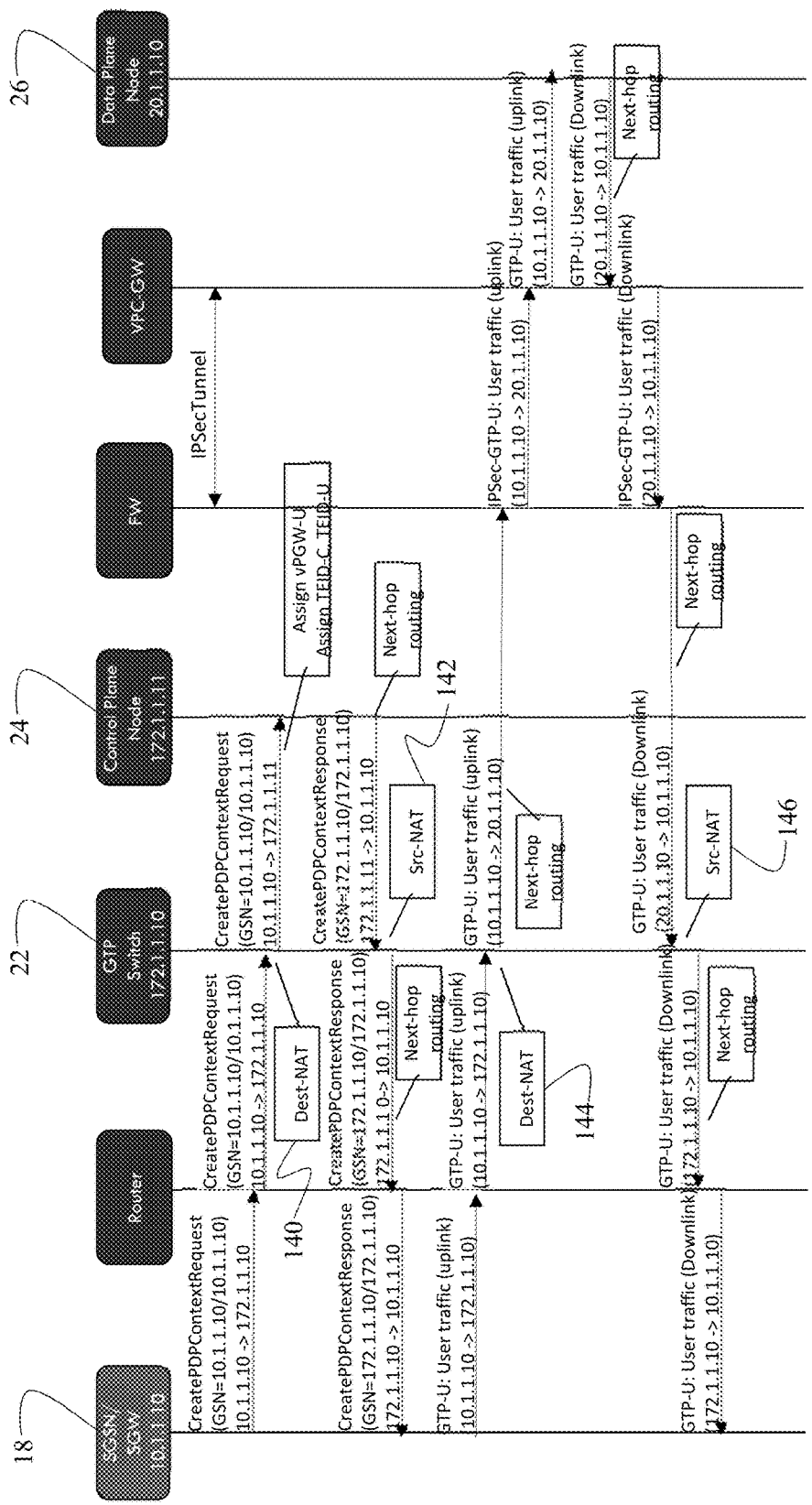
FIG. 4 is a signaling diagram schematically depicting a message flow of GTP messages and Network Address Translation (NAT) performed by the GTP Switch.

FIG. 4 depicts a signaling diagram illustrating Network Address Translation (NAT) performed by GTP Switch 22. In step 140, GTP Switch 22 performs destination NAT to translate destination IP address from GTP Switch 22 to selected control plane node 24 for uplink GTP-C messages. In step 142, GTP Switch 22 performs source NAT to translate source IP address from GTP Switch 22 to SGSN/S-GW 18 for downlink GTP-C messages. In step 144, GTP Switch 22 performs destination NAT to translate destination IP address from GTP switch to selected data plane node 26 for uplink GTP-U messages. In step 46, GTP Switch 22 performs source NAT to translate source IP address from GTP Switch 22 to SGSN/S-GW 18 for downlink GTP-U messages.

In an embodiment depicted in FIG. 4, upon receiving a CreatePDPContext request (GTPv1) or CreateSessionRequest (GTPv2) from SGSN/S-GW 18, control plane node 24 assigns GTP uplink tunnel-id for control plane (TEID-C) as well as GTP uplink tunnel-id for data plane (TEID-D). TEID-D is constructed by the data plane node identifier as prefix, followed by a sequence number. Upon receiving a GTP-U packet, GTP Switch 22 maps identity of data plane node 26 from prefix of the GTP uplink tunnel-id for data plane.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method of providing a distributed deployment of a control plane and a data plane of General Packet Radio Service (GPRS) Tunneling Protocol (GTP), comprising:
   providing a GTP Switch;
   providing a Serving GPRS Support Node (SGSN) or a Serving Gateway (S-GW) in communication with the GTP Switch;
   providing a plurality of control plane nodes and a plurality of data plane nodes in communication with the GTP Switch;
   responsive to receiving a GTP Control signaling (GTP-C) message from the SGSN or the S-GW, identifying, by the GTP Switch, a first control plane node from the plurality of control plane nodes for control plane traffic, wherein the first control plane node is hosted on a first server;
   responsive to receiving a GTP data (GTP-U) message from the SGSN or the S-GW, identifying a first data plane node from the plurality of data plane nodes for data plane traffic, wherein the first data plane node is hosted on a second server, different from the first server, whereby the first control plane node and the first data plane node are separate network nodes;
   routing subsequent uplink GTP-C messages from the SGSN or the S-GW to the first control plane node, wherein the GTP Switch performs Network Address Translation (NAT) to translate a destination Internet Protocol (IP) address of the GTP Switch to an IP address of the first control plane node;
   routing subsequent downlink GTP-C messages from the first control plane node to the SGSN or the S-GW, wherein the GTP Switch performs NAT to translate a source IP address of the GTP Switch to an IP address of the SGSN or the S-GW;
   routing subsequent uplink GTP-U messages from the SGSN or the S-GW to the first data plane node, wherein the GTP Switch performs NAT to translate the destination IP address of the GTP Switch to an IP address of the first data plane node; and
   routing subsequent downlink GTP-U messages from the first data plane node to the SGSN or the S-GW, wherein the GTP Switch performs NAT to translate the source IP address of the GTP Switch to the IP address of the SGSN or the S-GW.

2. The method of claim 1, wherein the GTP Switch performs data encryption and decryption of the subsequent GTP-C or the subsequent GTP-U messages.

3. The method of claim 2, wherein data encryption is achieved using an encryption algorithm selected from the group consisting of Transport Layer Security (TLS), Secure Sockets Layer (SSL), or Advanced Encryption Standard (AES).

4. The method of claim 2, wherein an encryption key or a decryption key is applied on a per GTP-U tunnel basis.

5. The method of claim 1, wherein the first control plane node is identified based on visited network being identified as a home network or a roaming network.

6. The method of claim 5, wherein the first control plane node is identified based on an International Mobile Subscriber Identity (IMSI) attribution selected from the group consisting of an IMSI range, an IMSI owner, and an IMSI profile.

7. The method of claim 1, wherein the first data plane node is identified based on a server network interconnection status with a remote content system.

8. The method of claim 1, wherein the first data plane node is identified based on a current data plane node system being statistic, load-share, or active-standby for multiple nodes.

9. The method of claim 1, wherein the first data plane node is identified by the GTP Switch or by the first control plane node.

10. A system for providing a distributed deployment of a control plane and a data plane of General Packet Radio Service (GPRS) Tunneling Protocol (GTP), comprising:
   a GTP Switch;
   a Serving GPRS Support Node (SGSN) or a Serving Gateway (S-GW) in communication with the GTP Switch;
   a plurality of control plane nodes and a plurality of data plane nodes in communication with the GTP Switch;
   wherein the GTP Switch is configured to execute steps comprising:
      responsive to receiving a GTP Control signaling (GTP-C) message from the SGSN or the S-GW, identifying a first control plane node from the plurality of control plane nodes for control plane traffic, wherein the first control plane node is hosted on a first server;
      responsive to receiving a GTP data (GTP-U) message from the SGSN or the S-GW, identifying a first data plane node from the plurality of data plane nodes for data plane traffic, wherein the first data plane node is hosted on a second server, different from the first server, whereby the first control plane node and the first data plane node are separate network nodes;
      routing subsequent uplink GTP-C messages from the SGSN or the S-GW to the first control plane node, wherein the GTP Switch performs Network Address Translation (NAT) to translate a destination Internet Protocol (IP) address of the GTP Switch to an IP address of the first control plane node;
      routing subsequent downlink GTP-C messages from the first control plane node to the SGSN or the S-GW, wherein the GTP Switch performs NAT to translate a source IP address of the GTP Switch to an IP address of the SGSN or the S-GW;
      routing subsequent uplink GTP-U messages from the SGSN or the S-GW to the first data plane node, wherein the GTP Switch performs NAT to translate the destination IP address of the GTP Switch to an IP address of the first data plane node; and
      routing subsequent downlink GTP-U messages from the first data plane node to the SGSN or the S-GW, wherein the GTP Switch performs NAT to translate the source IP address of the GTP Switch to the IP address of the SGSN or the S-GW.

11. The system of claim 10, wherein the GTP Switch performs data encryption and decryption of the subsequent GTP-C or the subsequent GTP-U messages.

12. The system of claim 11, wherein data encryption is achieved using an encryption algorithm selected from the group consisting of Transport Layer Security (TLS), Secure Sockets Layer (SSL), or Advanced Encryption Standard (AES).

13. The system of claim 11, wherein an encryption key or a decryption key is applied on a per GTP-U tunnel basis.

14. The system of claim 10, wherein the first control plane node is identified based on visited network being identified as a home network or a roaming network.

15. The system of claim 14, wherein the first control plane node is identified based on an International Mobile Subscriber Identity (IMSI) attribution selected from the group consisting of an IMSI range, an IMSI owner, and an IMSI profile.

16. The system of claim 10, wherein the first data plane node is identified based on a server network interconnection status with a remote content system.

17. The system of claim 10, wherein the first data plane node is identified based on a current data plane node system being statistic, load-share, or active-standby for multiple nodes.

* * * * *